(12) United States Patent
Daly et al.

(10) Patent No.: US 12,506,598 B2
(45) Date of Patent: Dec. 23, 2025

(54) METHODS FOR CONTROLLING ACCESS TO DECENTRALIZED NETWORK RESOURCES AND DEVICES THEREOF

(71) Applicant: MakeInfinite Labs, Inc., San Clemente, CA (US)

(72) Inventors: Henry Daly, Arvada, CO (US); Scott Edward Daly Dykstra, Ft. Myers, FL (US)

(73) Assignee: MakeInfinite Labs, Inc., San Clemente, CA (US)

( * ) Notice: Subject to any disclaimer, the term of this patent is extended or adjusted under 35 U.S.C. 154(b) by 78 days.

(21) Appl. No.: 18/664,372

(22) Filed: May 15, 2024

(65) Prior Publication Data
US 2025/0358101 A1    Nov. 20, 2025

(51) Int. Cl.
*H04L 9/08* (2006.01)
*H04L 9/32* (2006.01)

(52) U.S. Cl.
CPC .......... *H04L 9/0825* (2013.01); *H04L 9/3213* (2013.01); *H04L 9/3247* (2013.01)

(58) Field of Classification Search
CPC .... H04L 9/0825; H04L 9/3213; H04L 9/3247
See application file for complete search history.

(56) References Cited

U.S. PATENT DOCUMENTS

| | | | | |
|---|---|---|---|---|
| 2010/0125612 A1* | 5/2010 | Amradkar | ............. | H04L 63/105 707/E17.014 |
| 2012/0144202 A1* | 6/2012 | Counterman | ....... | H04L 63/0876 713/176 |
| 2023/0163967 A1* | 5/2023 | Cannata, Jr. | .......... | H04L 9/3263 713/156 |
| 2024/0273542 A1* | 8/2024 | Rojas | .................... | H04L 9/3247 |

FOREIGN PATENT DOCUMENTS

WO    2024233877 A2    11/2024

* cited by examiner

*Primary Examiner* — Shanto Abedin
(74) *Attorney, Agent, or Firm* — Troutman Pepper Locke LLP

(57) ABSTRACT

Methods, non-transitory computer-readable media, and access control apparatuses are disclosed that, after creating a resource in response to a creation request, provide a resource identifier for the resource and a public key of a key pair to an authorizer service for insertion into a mapping. An authorization request is sent to the authorizer service in response to an operation request to perform an operation on the resource that comprises the resource identifier and a token signed with a private key of the key pair. The authorization request comprises the resource identifier, the operation, and the token and the token identifies a capability. The operation is then executed on the resource when a signature of the token is validated by the authorizer service using the public key retrieved from the mapping and the operation is validated based on a match of the operation and the capability.

21 Claims, 7 Drawing Sheets

METHODS FOR CONTROLLING ACCESS TO DECENTRALIZED NETWORK RESOURCES AND DEVICES THEREOF

FIELD

This technology generally relates to network security and access control and, more particularly, to methods and devices for controlling access to decentralized network resources.

BACKGROUND

Access control lists (ACLs) are commonly used in centralized computer networks to provide network security by restricting access to system resources to permissioned users. ACLs generally include a list of rules or permissions that specify which users are granted or denied access to specified objects or system resources.

However, resources are increasingly deployed across decentralized networks to yield advantages including efficient scaling, reduced vulnerability to network attacks, and improved reliability, among many others. Decentralized networks are trustless in that there is no central authority that controls the network or the resources deployed on nodes of the network.

Maintaining an ACL in a trustless, decentralized network is not possible because there is no trusted central authority to host or store the ACL. Thus, there is currently no efficient way to prove an identity is authorized to perform an operation with respect to a resource in a decentralized network.

SUMMARY

In one example, a method for controlling access to decentralized network resources is disclosed that is implemented by an access control apparatus. In another example, an access control apparatus is disclosed that includes memory having instructions stored thereon and one or more processors coupled to the memory and configured to execute the stored instructions to carry out the method for controlling access to decentralized network resources. In yet another example, a non-transitory computer-readable medium having stored thereon instructions is disclosed, which includes executable code that, when executed by one or more processors, causes the one or more processors to carry out the method for controlling access to decentralized network resources.

In some examples, the method for controlling access to decentralized network resources includes, after creating a resource in response to a creation request, providing a resource identifier for the resource and a public key of a key pair to an authorizer service for insertion into a stored mapping. The creation request comprises the resource identifier and the public key. An authorization request is sent to the authorizer service in response to an operation request to perform an operation on the resource. The operation request comprises the resource identifier and a token signed with a private key of the key pair, the authorization request comprises the resource identifier, the operation, and the token, and the token identifies a capability. An authorization of the operation request is then received from the authorization service in response to the authorization request when a signature of the token is validated by the authorizer service using the public key retrieved from the stored mapping using the resource identifier and the operation is validated by the authorizer service based on a match of the operation and the capability. The operation is executed on the resource by communicating with at least one of a plurality of nodes of a decentralized network in response to the authorization of the first operation request.

This technology provides several advantages including methods, non-transitory computer-readable media, and access control apparatuses that advantageously provide capability-based authorization for operations on resources in a trustless, decentralized network using tokens and asymmetric cryptography. With this technology, a resource provider or other authorization service that is deployed across untrusted nodes in any network (e.g., decentralized or centralized networks) advantageously does not hold secrets (e.g., private keys), which are instead maintained client-side or by a trusted gateway service. Accordingly, this technology more effectively and efficiently provides access control for resources in decentralized networks.

DETAILED DESCRIPTION

Figure 1:
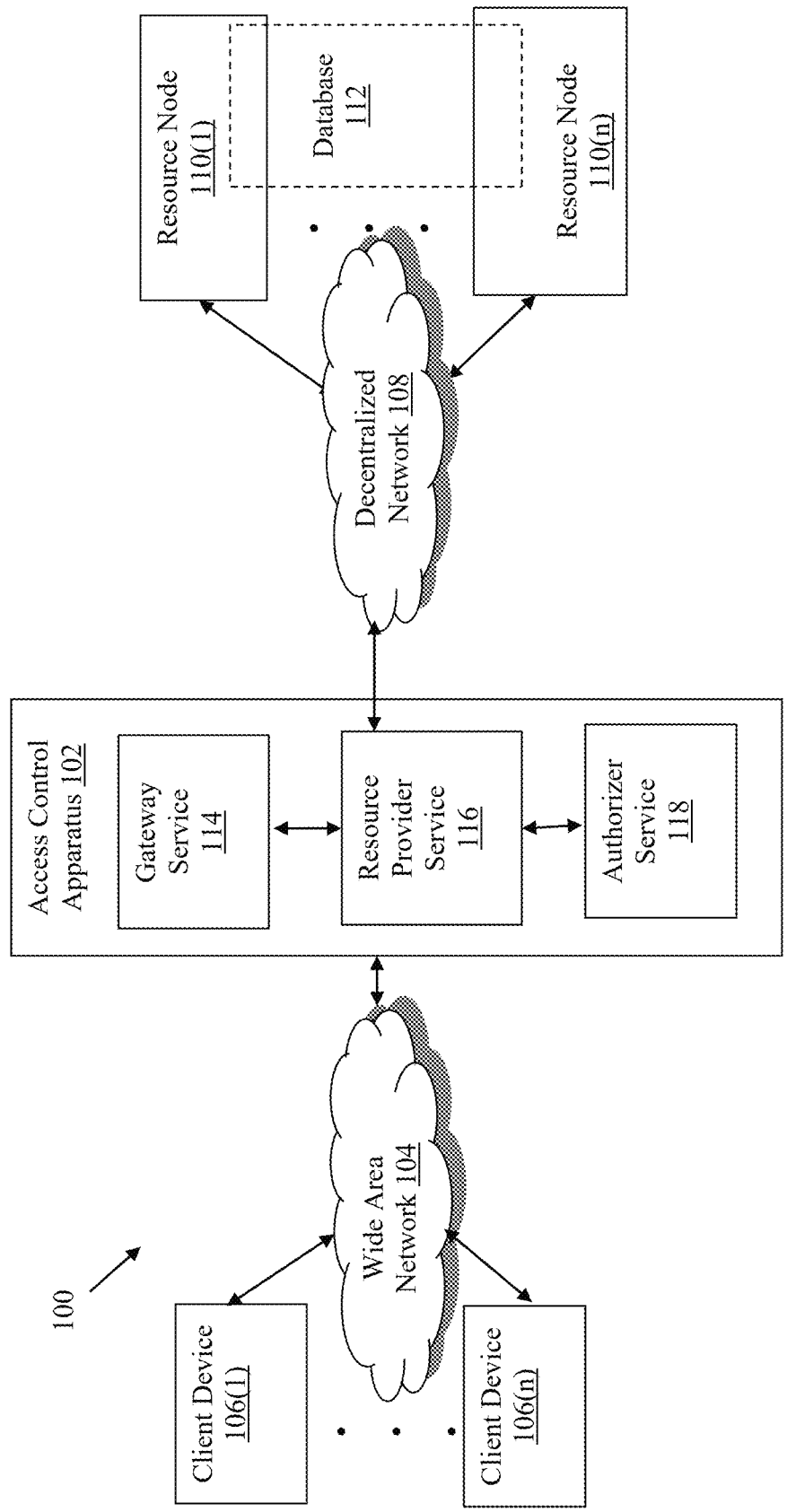
FIG. 1 is a block diagram of an exemplary network environment with an access control apparatus.

Referring to FIG. 1, an exemplary network environment 100 is illustrated that includes an access control apparatus 102 coupled, via wide area network (WAN) 104, to client devices 106(1)-106(n) and, via decentralized network 108, to resource nodes 110(1)-110(n) hosting a database 112. The network environment 100 may include other network devices such as one or more routers or switches, for example, which are known in the art and thus will not be described herein. This technology provides several advantages including methods, non-transitory computer readable media, and devices that efficiently facilitate access control for resources in decentralized computer networks.

In this example, the client devices 106(1)-106(n), access control apparatus 102, and resource nodes 110(1)-110(n) are disclosed in FIG. 1 as dedicated hardware devices. However, one or more of the client devices 106(1)-106(n), access control apparatus 102, or resource nodes 110(1)-110(n) can also be implemented in software within one or more other devices in the network environment 100. Moreover, the access control apparatus 102 in this example hosts a gateway service 114, a resource provider service 116, and an authorizer service 118, which are described in detail below and can be implemented in software on the same or different hardware device(s) as each other and/or one or more other components in the network environment 100. For example, the resource provider service 116 and/or the authorizer service 118 may be implemented in software executing on one of the resource nodes 110(1)-110(n).

Even further, any number of gateway, resource provider, or authorizer services may be executed within a distributed network and/or on other nodes of the decentralized network 108 (e.g., resource nodes 110(1)-110(n)). Thus, the access control apparatus 102 in some examples represents a plurality of nodes coupled to the decentralized network 108 and/or a distributed cluster of computing devices hosting containerized application(s) (e.g., a Kubernetes™ cluster) and/or virtual machine(s) executing the gateway, resource provider, and/or authorizer service(s). Many other permutations and types of implementations and network topologies can also be used in other examples.

Figure 2:
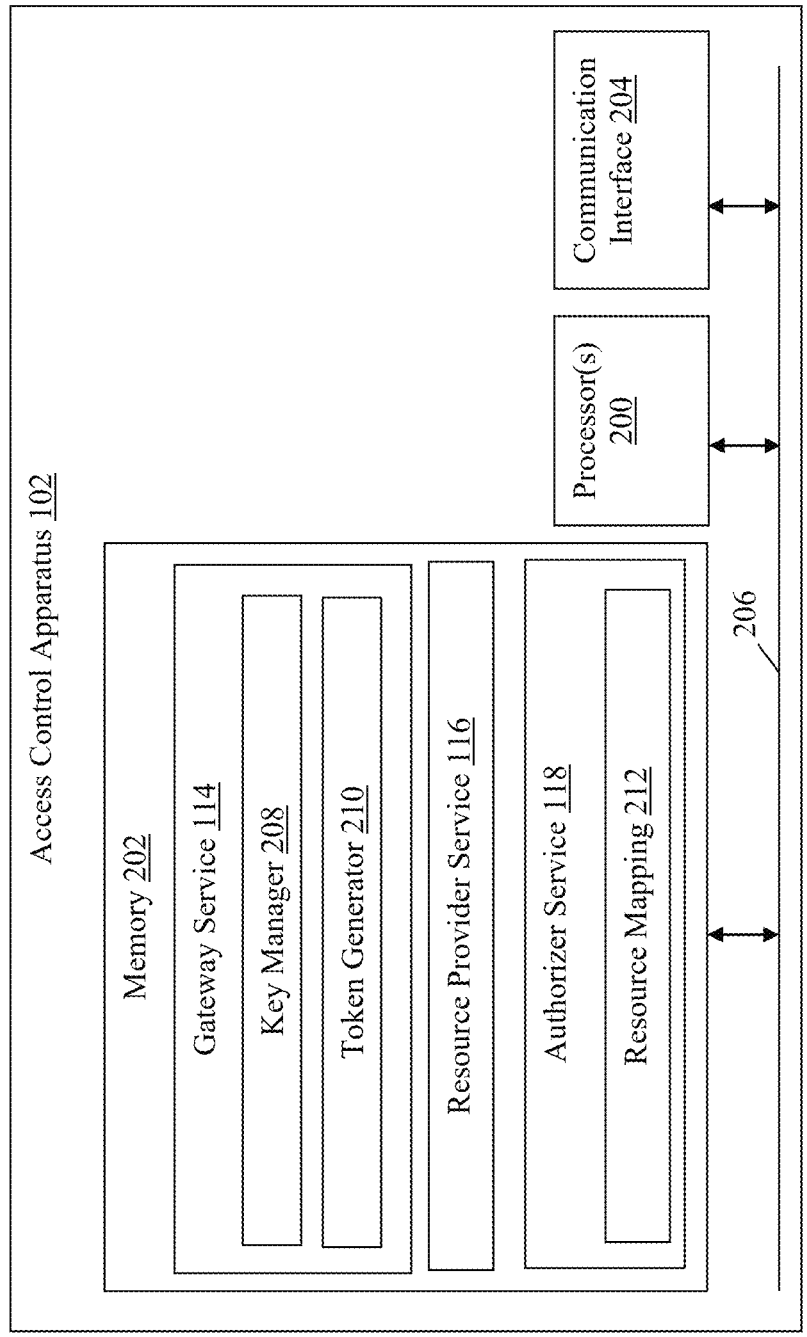
FIG. 2 is a block diagram of an exemplary access control apparatus.

Referring to FIGS. 1-2, the access control apparatus 102 may perform any number of functions, including providing interfaces to the client devices 106(1)-106(n) for performing operations on resources. In this example, the resources (e.g., tables) are associated with the database 112 (e.g., a structured query language (SQL) database, a blockchain with blocks storing transaction data) and the operations include creating, altering, and deleting tables, inserting data into tables, and searching and/or extracting data from tables, although any other types of resources and/or operations on those resources can also be facilitated by the access control apparatus 102 when those operations are determined to be authorized, as will be explained in more detail below.

The access control apparatus 102 in this example includes processor(s) 200, memory 202, and a communication interface 204, which are coupled together by a bus 206, although the access control apparatus 102 can include other types or numbers of elements in other configurations. The processor(s) 200 of the access control apparatus 102 may execute programmed instructions stored in the memory 202 of the access control apparatus 102 for any number of the functions described and illustrated herein. The processor(s) 200 may include one or more general purpose processors with one or more processing cores, central processing units (CPUs), and/or graphics processing units (GPUs) for example, although other types of processor(s) can also be used.

The memory 202 stores these programmed instructions for one or more aspects of the present technology as described and illustrated herein, although some or all the programmed instructions could be stored elsewhere. A variety of different types of memory storage devices, such as random-access memory (RAM), read only memory (ROM), hard disk, solid state drives, flash memory, or other computer-readable medium which is read from and written to by a magnetic, optical, or other reading and writing system that is coupled to the processor(s) 200, can be used for the memory 202.

Accordingly, the memory 202 can store applications that can include computer executable instructions that, when executed by the processor(s) 200, cause the access control apparatus 102 to perform actions, such as to transmit, receive, or otherwise process network messages and requests, for example, and to perform other actions described and illustrated below. The application(s) can be implemented as components of other applications, operating system extensions, and/or plugins, for example.

Further, the application(s) may be operative in a cloud-based or other distributed and/or decentralized computing environment with access provided via a software-as-a-service (SaaS) model. The application(s) can be executed within or as virtual machine(s) or virtual server(s) that may be managed or supervised by a hypervisor and/or deployed in a distributed and/or decentralized computing environment. Also, the application(s), and even the access control apparatus 102 itself, may be in virtual server(s) running in a distributed and/or decentralized computing environment rather than being tied to specific physical network computing devices.

In this example, the memory 202 includes the gateway service 114 with a key manager 208 and a token generator 210, the resource provider service 116, and the authorizer service 118 that includes resource mapping 212. The gateway service 114 is generally disposed between the client devices 106(1)-106(n) and the resource nodes 110(1)-110(n) and optionally disposed between the client devices 106(1)-106(n) and the resource provider service 116. Thus, the inclusion of the gateway service 114, resource provider service 116, and authorizer service 118 in the memory 202 of the access control apparatus 102 as illustrated in FIG. 2 is for exemplary purposes only and the various services can be deployed elsewhere in the network environment 100 as explained in more detail above.

The optional gateway service 114 provides an interface for the client devices 106(1)-106(n) to make requests to perform operations on resources, such as the database 112, including requests to create resources. In response to a request to create a resource (e.g., a table of database 112), the key manager 208 of the gateway service 114 generates a public/private key pair and stores the public/private key pair as associated with a resource identifier (e.g., table name or other unique identifier) for the created resource.

In response to a request to perform an operation on a previously created resource, the token generator 210 of the gateway service 114 generates a token and signs the generated token using the private key of the stored key pair associated with the resource identifier for the previously created resource. The contents of the token will be described and illustrated in more detail below. After generating the token, the gateway service 114 sends the request to perform the operation on the resource, along with the generated token, to the resource provider service 116.

The resource provider service 116 is generally an interface between the client devices 106(1)-106(n) or, when present, the gateway service 114 and the resource nodes 110(1)-110(n). Thus, the resource provider service 116 manages the creation of resources and executes requested operations on those resources. For example, the resource provider can facilitate execution of requested queries against the database 112. The resource provider service 116 communicates with the authorizer service 118 to determine whether the operations requested by the client devices 106(1)-106(n) are authorized (e.g., by a creator, host, or owner of a resource).

Thus, the authorizer service 118 authorizes operation requests using a public key and resource identifier obtained from the resource provider service 116, which the resource provider service 116 obtained the public key and the resource identifier from one of the client devices 106(1)-106(n) or, when present, the gateway service 114. The authorizer stores the mapping of public keys to resource identifiers in the resource mapping 212 after creation of a resource by the resource provider service 116. To authorize a resource operation, the authorizer validates a token received from the resource provider service 116 using the stored public key and, with the decoded token, validates the operations against a capabilities payload of the token, as explained in more detail below.

Upon successful validation, the authorizer service 118 communicates the same to the resource provider service 116 to facilitate execution of the requested operation on the resource and subsequent communication with the requesting one of the client devices 106(1)-106(n) regarding the same.

Other information can be stored in the memory 202 in other examples, and other data stores and/or applications or modules also can be hosted by the access control apparatus 102 in other examples.

The communication interface 204 of the access control apparatus 102 operatively couples and communicates between the access control apparatus 102, client devices 106(1)-106(n), and resource nodes 110(1)-110(n), which are coupled together at least in part by the WAN 104 and decentralized network 108 in this particular example, although other types or numbers of communication networks or systems with other types or numbers of connections or configurations to other devices or elements can also be used. The WAN 104 and/or decentralized network 108 can use TCP/IP over Ethernet and industry-standard protocols, although other types or numbers of protocols or communication networks can also be used. The WAN 104 and/or decentralized network 108 can employ any suitable interface mechanisms and network communication technologies including, for example, Ethernet-based Packet Data Networks (PDNs).

As explained above, the access control apparatus 102 is illustrated in this example as including a single device, but in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the access control apparatus 102. Additionally, one or more of the devices that together comprise the access control apparatus 102 in other examples can be standalone devices or integrated with one or more other devices (e.g., one of the resource nodes 110(1)-110(n)) or apparatuses.

The resource nodes 110(1)-110(n) of the network environment 100 may perform any number of functions, including hosting the database 112 and/or processing queries to generate query results from the contents of the database 112, for example. Each of the resource nodes 110(1)-110(n) in this example includes processor(s), memory, and a communication interface, which are coupled together by a bus 208, although the resource nodes 110(1)-110(n) can include other types or numbers of elements in other configurations.

The processors of the resource nodes 110(1)-110(n) may execute programmed instructions stored in the memory for any number of the functions described and illustrated herein. The processor may include one or more general purpose processors with one or more processing cores, for example, although other types of processor(s) can also be used.

The memory stores these programmed instructions for one or more aspects of the present technology as described and illustrated herein, although some or all the programmed instructions could be stored elsewhere. A variety of different types of memory storage devices, such as RAM, ROM, hard disk, solid state drives, flash memory, or other computer-readable medium which is read from and written to by a magnetic, optical, or other reading and writing system that is coupled to the processors, can be used for the memory.

Accordingly, the memory can store applications that can include computer executable instructions that, when executed by the processors, cause the resource nodes 110(1)-110(n) to perform actions, such as to transmit, receive, or otherwise process network messages and requests, for example, and to perform other actions described and illustrated below. The application(s) can be implemented as components of other applications, operating system extensions, and/or plugins, for example.

Further, the application(s) may be operative in a cloud-based or distributed and/or decentralized computing environment with access provided via a SaaS model. The application(s) can be executed within or as virtual machine(s) or virtual server(s) that may be managed in a distributed and/or decentralized computing environment. Also, the application(s), and even the resource nodes 110(1)-110(n) themselves, may be in virtual server(s) running in a distributed and/or decentralized computing environment rather than being tied to specific physical network computing devices. Also, the application(s) may be running in VMs executing on the verifier device and managed or supervised by a hypervisor.

The communication interface of the resource nodes 110(1)-110(n) operatively couples and communicates between the resource nodes 110(1)-110(n) and at least the resource provider service 116 of the access control apparatus 102, which are coupled together at least in part by the decentralized network 108, for example. In some examples, the resource nodes 110(1)-110(n) are database servers deployed in the decentralized network 108 and the database 112 is a decentralized database, although other types of implementations can also be used. Additionally, other types or numbers of networks and connections with other types or numbers of configurations to other devices or elements can also be used in other examples.

Each of the client devices 106(1)-106(n) of the network environment 100 in this example includes any type of computing device that can exchange network data, such as mobile, desktop, laptop, or tablet computing devices, server devices, virtual machines (including cloud-based computers), or the like. Each of the client devices 106(1)-106(n) includes a processor, memory, and a communication interface, which are coupled together by a bus or other communication link (not illustrated), although other numbers or types of components could also be used.

Each of the client devices 106(1)-106(n) may run services and/or interface applications, such as standard web browsers or the standalone applications, which may provide an interface to communicate with the access control apparatus 102 via the WAN 104. Each of the client devices 106(1)-106(n) may further include a display device, such as a display screen or touchscreen, or an input device, such as a keyboard or mouse, for example (not shown).

Although the exemplary network environment 100 with the client devices 106(1)-106(n), access control apparatus 102, resource nodes 110(1)-110(n), WAN 104, and decentralized network 108 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the client devices 106(1)-106(n), access control apparatus 102, or resource nodes 110(1)-110(n), for example, may be configured to operate as virtual instances on the same physical machine. In other words, one or more of the client devices 106(1)-106(n), access control apparatus 102, or resource nodes 110(1)-110(n) may operate on the same physical device rather than as separate devices communicating through the WAN 104 and decentralized network 108. Additionally, there may be more or fewer client devices, access control apparatuses, or resource nodes than illustrated in FIG. 1.

The examples of this technology may also be embodied as one or more non-transitory computer-readable media having instructions stored thereon, such as in the memory 202, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that will now be described and illustrated herein.

Figure 3:
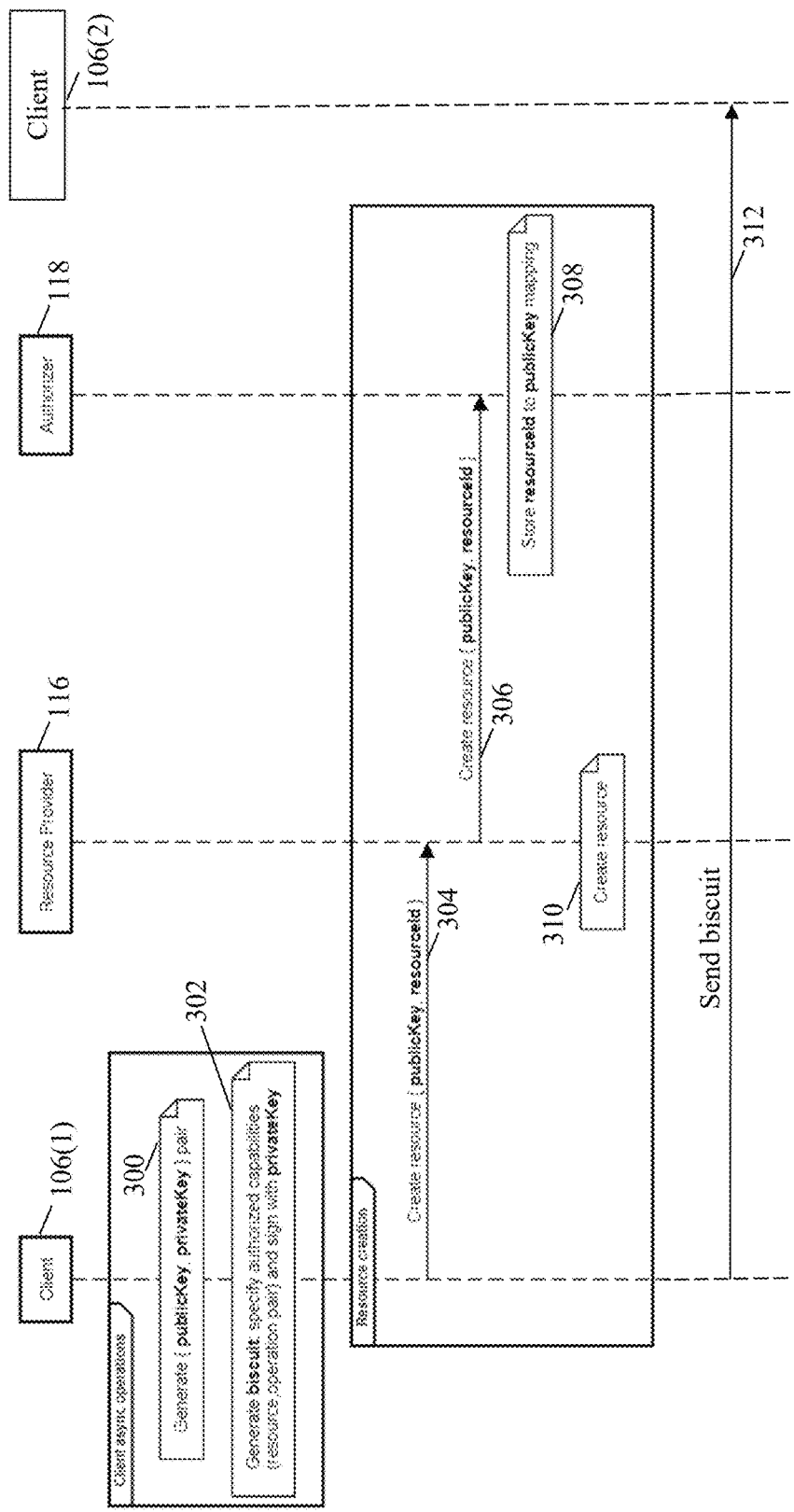
FIG. 3 is a timing diagram of an exemplary method for resource creation in a decentralized network.

Referring now to FIG. 3, a timing diagram of an exemplary method for resource creation in a decentralized network is illustrated. In step 300 in this example, the client device 106(1) generates a key pair including a public key and a private key in an asynchronous operation phase. The key pair supports asymmetric cryptography and can be generated in accordance with the Edwards-curve Digital Signature Algorithm (EdDSA), such as ED25519 as disclosed in Josefsson, S., "Edwards-Curve Digital Signature Algorithm (EdDSA)," Internet Research Task Force (IRTF), Request for Comment 8032 January, 2017, which is incorporated by reference herein in its entirety, although any other algorithm can be used to generate the key paid in other examples. In this example, the client device 106(1) maintains custody of its private key (e.g., via local storage on memory of the client device 106(1).

In step 302 within the asynchronous operations phase, the client device 106(1) generates a token that specifies one or more authorized capabilities and signs the payload of the token with the private key generated in step 300. In some examples, the token payload includes check(s) that define validations or restrictions as to use of the token. For example, the checks can specify the user(s) allowed to use the token, resource(s) (e.g., table(s) of the database 112) that can be accessed with the token, operation(s) (e.g., read or write) that can be performed with the token (e.g., on the specified resources), and/or timeframe during which the token can be used (e.g., a validity period after which the token is expired or a daily time window), although other types and/or number of checks can also be specified in the token in other examples.

In some examples, the token also includes at least a resource/operation pair that represents an operation that is allowed to be performed on the resource. The token can be a bearer token, authorization token, capabilities ticket, or any other data structure that provides the functionality described and illustrated by way of the examples herein. In FIG. 3, the token is referred to as a biscuit and is an authorization token generated in a Datalog logic language, although any other type of token can also be used.

Figure 4:
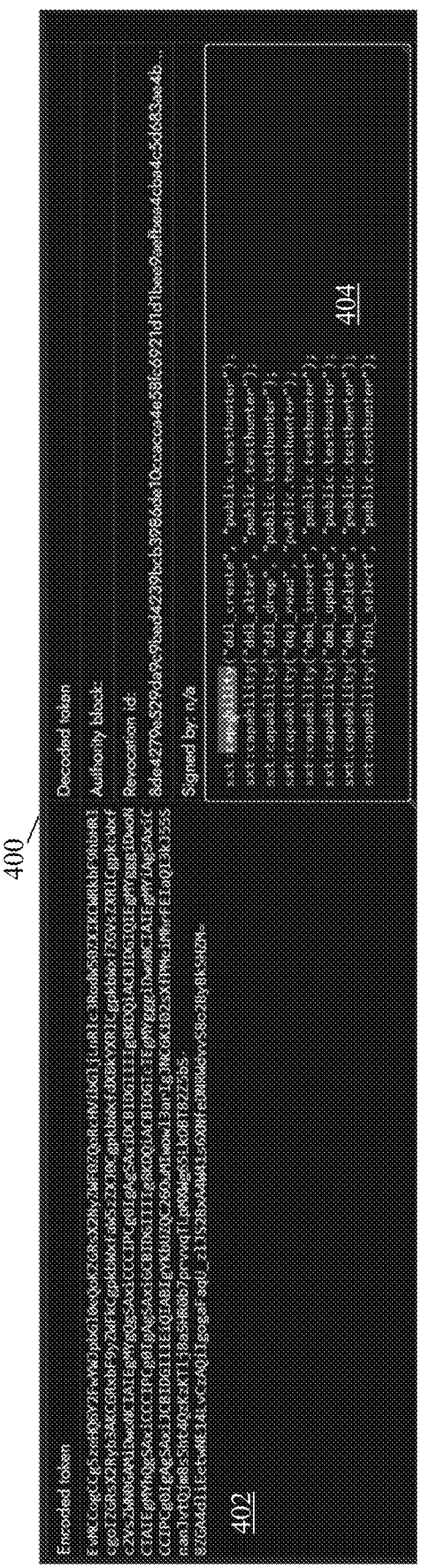
FIG. 4 is an exemplary token encoding and decoding.

Referring to FIG. 4, an exemplary biscuit 400 in the form of an encoded token 402 and decoded token 404 is illustrated. In the decoded token 404, the payload includes capabilities each including an operation (e.g., create, alter, drop, read, insert, updated, delete, and select) and a corresponding resource (e.g., testhunter), which can be a table of the database 112. The payload of the decoded token 404 can be encoded as illustrated in the encoded token 402 using a private key such that a holder of a corresponding public key can generate the decoded token 404 from the encoded token 402.

Referring back to FIG. 3, in step 304, the client device 106(1) sends a first creation request to the resource provider service 116 to create a resource, such as one of the resources that was identified in one or more of the check(s) in the token created in step 302. The first creation request includes the public key of the key pair generated in step 300 and a resource identifier for the resource, such as a table name in an example in which the resource is a table of the database 112.

In step 306, the resource provider service 116 sends a second creation request to the authorizer service 118. The second creation request includes the public key and the resource identifier received by the resource provider service 116 with the first creation request.

In step 308, the authorizer service 118 stores the resource identifier in association with the public key in a stored mapping, such as the resource mapping 212. The public key can be used to authorize subsequent requests associated with the resource corresponding to the resource identifier, as explained in detail below.

In step 310, the resource provider service 116 creates the resource in accordance with the resource identifier, such as by creating a table having a name corresponding to the resource identifier in the database 112 via communication with one or more of the resource nodes 110(1)-110(n), for example. While the resource is created after the second creation request is sent to the authorizer service 118 in this example, in other examples, the resource can be created before the second creation request is sent or in parallel with sending the second creation request.

In step 312, the client device 106(1) sends the signed or encoded token created in step 302 to another client device 106(2) in this example. Optionally, the client device 106(1), or a user thereof, can be identified in one or more of the check(s) included in the token. For example, one of the check(s) can specify a capability that the user (e.g., as identified by a unique user identifier) is authorized to perform an operation (e.g., an access) on the resource (e.g., as identified by the resource identifier). With the token, the user of client device 106(1) can obtain authorization to access the resource, as will now be described and illustrated with reference to FIG. 5. In other examples, one or more of steps 300-312 can occur in parallel or in a different order than that illustrated in the example of FIG. 3.

Figure 5:
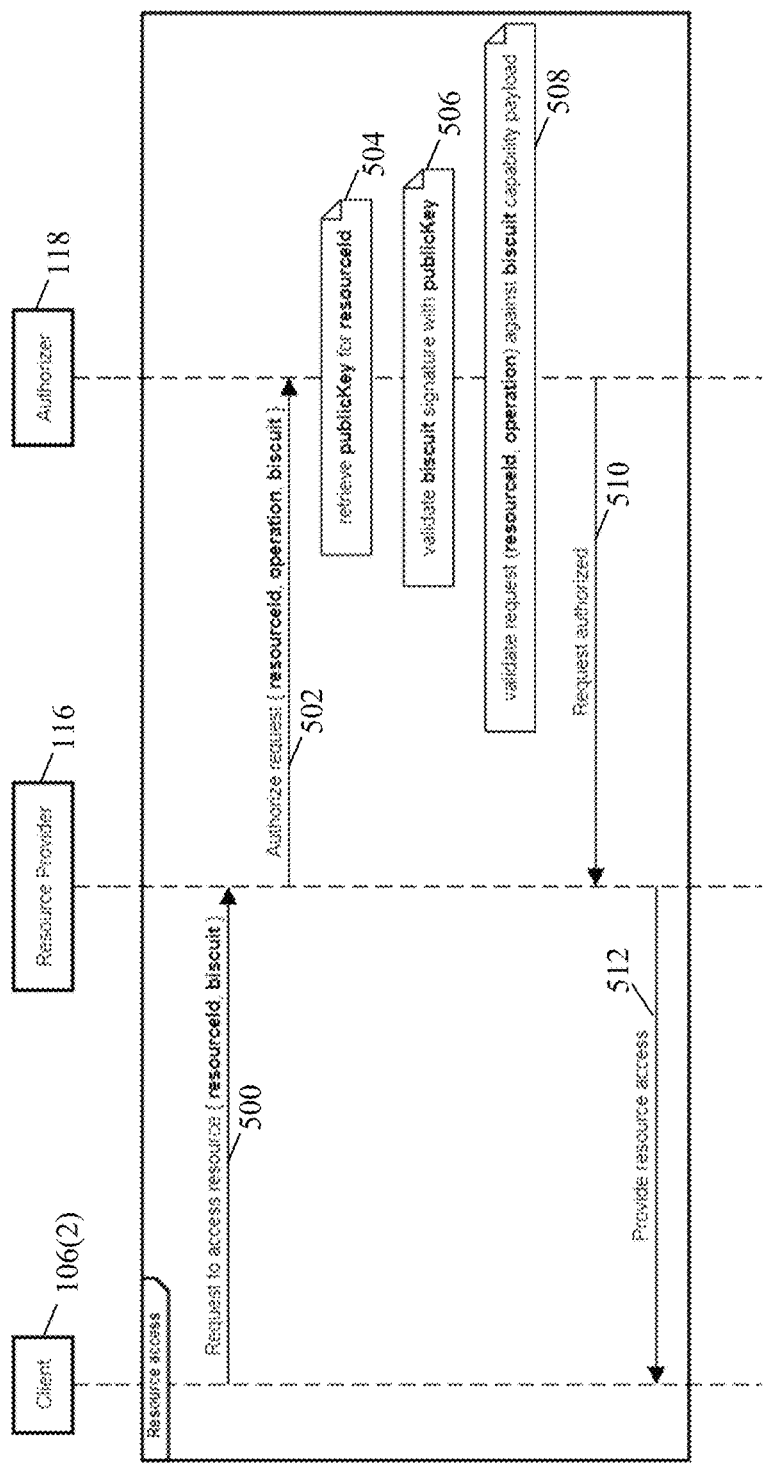
FIG. 5 is a timing diagram of an exemplary method for facilitating authorized operations on resources in a decentralized network.

Referring now to FIG. 5, a timing diagram of an exemplary method for facilitating authorized operations on resources in a decentralized network is illustrated. In step 500 in this example, the client device 106(2) sends an operation request to the resource provider service 116. The operation request in this example is an access or read and the operation request includes a resource identifier and a token, which in this example can be the table name in the first and second creation requests of steps 304 and 306 of FIG. 3 and the token created in step 302 of FIG. 3 and provided to the client device 106(2) in step 312 of FIG. 3. Thus, the client device 106(2) requests in step 500 to access a table of the database 112 via the operation request sent to the resource provider service 116.

In step 502, the resource provider service 116 sends an authorization request to the authorizer service 118 to determine whether the operation request from the client device 106(2) is authorized before allowing the client device 106(2) to perform the requested operation. The authorization request includes the resource identifier received in step 500, the requested operation (i.e., access), and the token received in step 500 in this example, although other information such as a user identifier of a user of the client device 106(2) from which the operation request was received, and/or a time at which the operation request was generated or received, can also be provided to the authorizer service 118 with the authorization request in step 502 in other examples.

In step 504, the authorizer service 118 retrieves the public key for the resource identifier from the stored resource mapping 212, which could have been stored in step 308 of FIG. 3, for example. Thus, the resource identifier was included in the authorization request received by the authorizer service 118 in step 502 and the public key originated with the client device 106(1) that owns or created the resource corresponding to the resource identifier.

In step 506, the authorizer service 118 validates the token received with the authorization request in step 502 with the public key retrieved from the stored resource mapping 212 in step 504. The token was signed by the client device 106(1) using the private key in step 304 of FIG. 3 in this example. Thus, the authorizer service 118 can effectively validate that private key signature using the public key of the key pair generated in step 304 of FIG. 3 in this example. If the signature cannot be validated, then the authorizer service 118 can reject the authorization request received in step 502.

However, in step 508 in this example in which the signature is validated, the authorizer service 118 validates the operation request against the token payload, which includes the check(s). Accordingly, the authorizer service 118 compares the resource identifier and the operation identified in the authorization request with the token payload to determine whether the operation (e.g., an access) is valid with respect to the resource (e.g., a table of the database 112) corresponding to the resource identifier. Other check(s) (e.g., timeframe and user identifier) can also be analyzed for authorization in step 508. If any of the check(s) is not satisfied, the operation is not valid, or the authorization request cannot be otherwise be validated, then the authorizer service 118 can reject the authorization request received in step 502.

However, in step 510 in this example in which the operation request is validated, the authorizer service 118 sends an authorization response to the resource provider service 116 in response to the authorization request. The authorization response indicates that the operation request has been validated and the client device 106(1) is authorized to perform the requested operation on the identified resource.

In step 512, the resource provider service 116 facilitates performance of the operation requested in step 500, which in this example results in the resource provider service 116 providing access to the resource (e.g., the table of the database 112) to the client device 106(2). In some examples, the provided access is effectively a read request resulting in the resource provider service 116 providing requests data from the table of the database 112 to the client device 106(2), although any other type of operation and/or resource can also be used in other examples.

Thus, advantageously, none of the services (i.e., the resource provider service 116 or authorizer service 118), which may be deployed on untrusted third-party nodes of a decentralized network, store the secret (i.e., the private key of the key pair created by the client device 106(1) in step 300 of FIG. 3) for the operation request originating from the client device 106(2) to be authenticated. In other examples, one or more of steps 500-512 can occur in parallel or in a different order than that illustrated in the example of FIG. 5.

Figure 6:
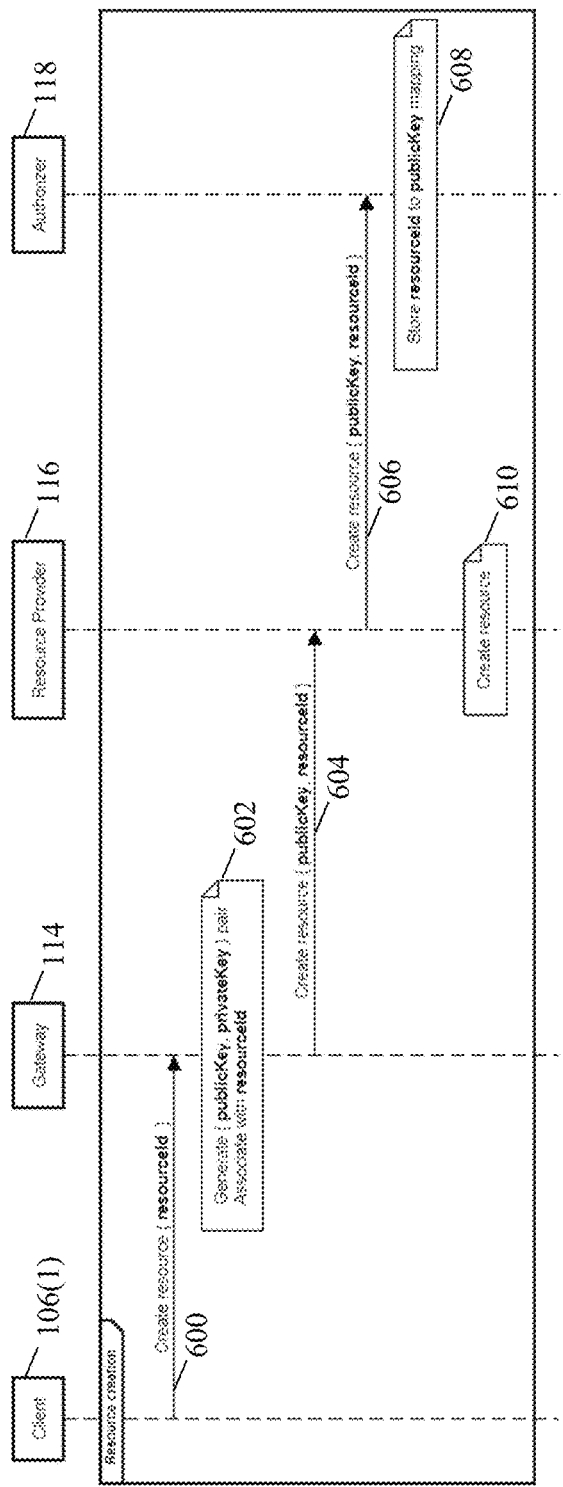
FIG. 6 is a timing diagram of an exemplary method for resource creation in a decentralized network using a gateway service.

Referring to FIG. 6, a timing diagram of an exemplary method for resource creation in a decentralized network using a gateway service is illustrated. In step 600 in this example, the client device 106(1) sends a first creation request to the gateway service 114. In this example, the first creation request includes a resource identifier for the resource (e.g., a table of the database 112) for which the client device 106(1) is requesting to be created.

In step 602, the gateway service 114 generates a key paid including a public key and a private key and stores an association of the key pair with the resource identifier in a stored mapping. The key pair can be generated as explained above with reference to step 300 of FIG. 3, but in this example, the gateway service 114 generates the key pair instead of receiving the public key from the client device 106(1) as generated by the client device 106(1).

In step 604, the gateway service 114 sends a second creation request to the resource provider service 116, which includes the public key generated in step 602 and the resource identifier received from the client device 106(1) in step 600. Thus, the second creation request of step 604 can be the same as the first resource request of step 304 of FIG. 3 except that it originates from the gateway service 114 instead of the client device 106(1).

In step 606, the resource provider service 116 sends a third creation request to the authorizer service 118, which includes the public key generated in step 602 and the resource identifier received from the client device 106(1) in step 600. Accordingly, the third creation request of step 606 can be the same as the second resource request of step 306 of FIG. 3 except that it originates from the gateway service 114 instead of the client device 106(1).

In step 608, the authorizer service 118 stores the resource identifier mapped to the public key and, in step 610, the resource provider service 116 creates the resource requested by the client device 1061(1). Thus, steps 608 and 610 of FIG. 6 proceed as explained above with reference to steps 308 and 310 of FIG. 3, respectively. In other examples, one or more of steps 600-610 can occur in parallel or in a different order than that illustrated in the example of FIG. 6.

Figure 7:
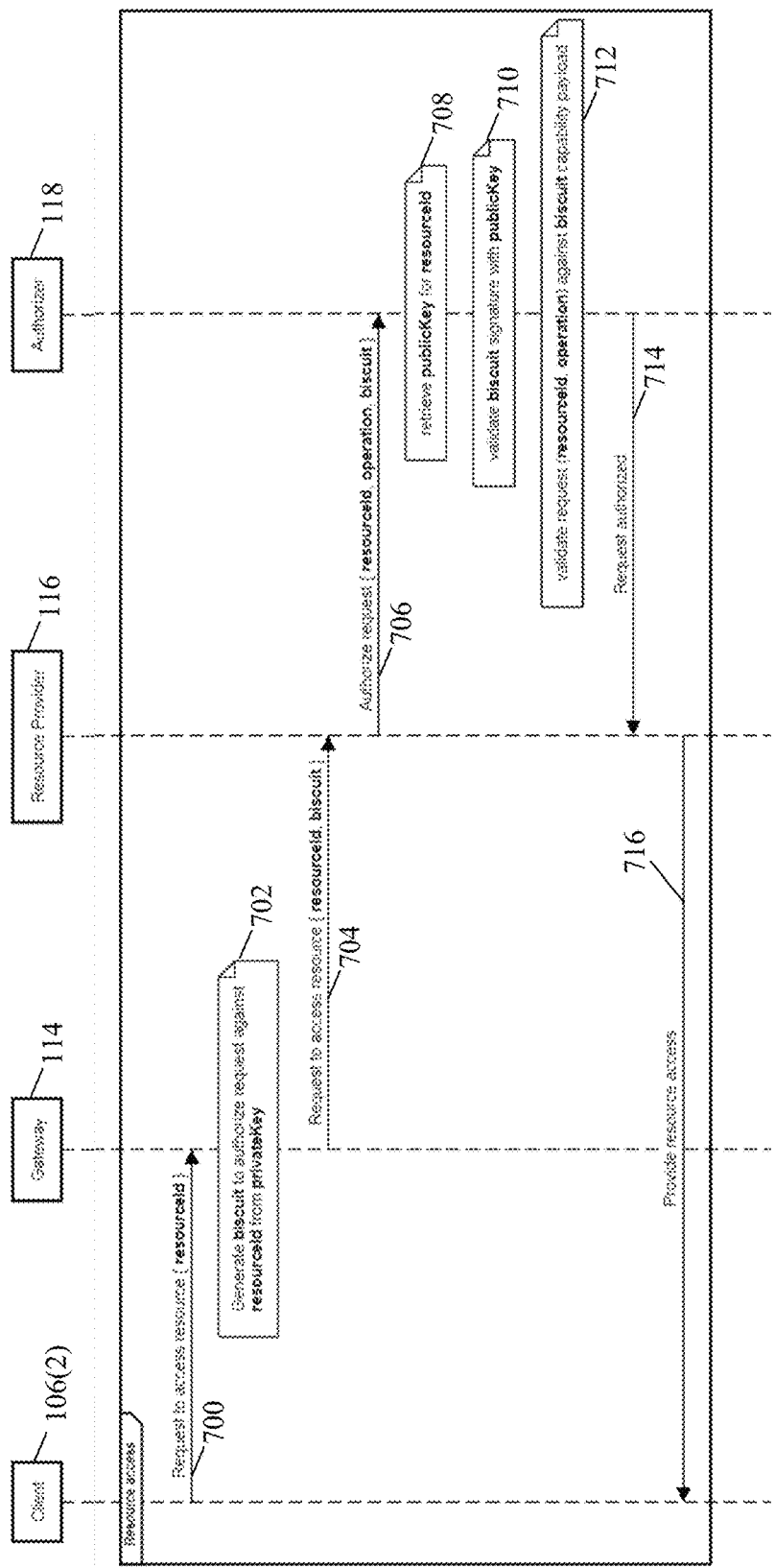
FIG. 7 is a timing diagram of an exemplary method for facilitating authorized operations on resources in a decentralized network using a gateway service.

Referring to FIG. 7, a timing diagram of an exemplary method for facilitating authorized operations on resources in a decentralized network using a gateway service is illustrated. In step 700 in this example, the client device 106(2) sends a first operation request to the gateway service 114, which includes the resource identifier for the resource (e.g., a table of the database 112) on which the client device 106(2) is requesting to perform the identified operation (e.g., an access).

In step 702, the gateway service 114 generates a token to authorize the operation request against the resource identifier. The token can be the same as the token generated as explained above with reference to step 302 of FIG. 3. However, the token in this example is generated by the gateway service 114 and signed using a private key previously generated and stored by the gateway service 114 instead of the client device 106(1). Thus, the gateway service retains custody of the key pairs in this example and is therefore a trusted third party entity within the network environment 100. The private key is retrieved by the gateway service 114 from a stored mapping based on the resource identifier of the operation request received in step 700.

Optionally, the client device 106(1) can provide other capabilities with the first creation request in step 600 of FIG. 6. For example, the client device 106(1) can specify user identifier(s) or users authorized to perform specified operation(s) on the resource to be created as a result of that request. In another example, the gateway service 114 can be preconfigured with capabilities authorized for particular resources. For example, the gateway service 114 can be preconfigured to authorize all accesses to tables of the database 112. In these examples, the token can be generated in step 702 with check(s) that are based on the obtained or preconfigured capabilities, and other methods for specifying the check(s) in the generated token can also be used in other examples.

In step 704, the gateway service 114 sends a second operation request to the resource provider service 116. The second authorization request includes the resource identifier received with the first operation request and the token generated in step 702. Thus, the second operation request of step 704 is the same as the operation request of step 500 of FIG. 5 except that the second operation request originates from the gateway service 114 instead of the client device 106(2).

In this example, steps 706-716 then proceed as described and illustrated in detail above with reference to steps 502-512, respectively. Optionally, the resource provider service 116 can provide access to the resource to the client device 106(2) via the gateway service 114 in some examples in which the gateway service 114 continues to act as a proxy between the client devices 106(1)-106(n) and the resource provider service 116. In other examples, one or more of steps 700-716 can occur in parallel or in a different order than that illustrated in the example of FIG. 7.

Accordingly, as described and illustrated by way of the examples herein, this technology more effectively and efficiently facilitates control of access and other operations executed against database and other resources in decentralized networks. Advantageously, the access control apparatus 102 of this technology does not have to store a role-based access control (RBAC) list or any secrets and therefore can be deployed across untrusted nodes in a decentralized network. While clients can maintain key pairs locally, even when a gateway service 114 is relied upon for key generation and custody, only a resource public key is maintained by the authorizer service 118, which can therefore be executed by third party decentralized network nodes.

With the corresponding private keys maintained by the clients or gateway service(s), users can create any resources or associated permissions. In particular, even resource deletion by a malicious third party will be prevented if unauthorized based on the malicious third party lacking the private key with which to sign a token that can be validated. Optionally, in some examples, malicious authorizer services can be mitigated by requiring multiple authorizer services to come to a consensus on whether an operation request should be authorized. In yet other examples, a denial of authorization by the authorizer service 118 could be contested by a user (e.g., of the client device 106(2)), such as by sending a request to the gateway service 114 for an audit of the authorizer service 118, for example. Other methods for further reducing the security risk of this technology can also be used in yet other examples.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method for controlling access to decentralized network resources, the method implemented by an access control apparatus and comprising:

after creating a resource in response to a first creation request, providing a resource identifier for the resource and a public key of a key pair to an authorizer service for insertion into a stored mapping, wherein the first creation request comprises the resource identifier and the public key;

sending an authorization request to the authorizer service in response to a first operation request to perform an operation on the resource, wherein the first operation request comprises the resource identifier and a token signed with a private key of the key pair, the authorization request comprises the resource identifier, the operation, and the token, and the token identifies a capability;

receiving an authorization of the first operation request from the authorization service in response to the authorization request when a signature of the token is validated by the authorizer service using the public key retrieved from the stored mapping using the resource identifier and the operation is validated by the authorizer service based on a match of the operation and the capability; and executing the operation on the resource by communicating with at least one of a plurality of nodes of a decentralized network in response to the authorization of the first operation request.

2. The method of claim 1, wherein the first creation request originates with a first client, the first operation request originates with a second client different from the first client, and the authorization request further comprises one or more of a time at which the first operation request was received or a user identifier of a user of the second client.

3. The method of claim 2, further comprising receiving the authorization when one or more of the time at which the first operation request was received is within a validity period or the user identifier is validated by the authorizer service based on one or more checks in a payload of the token, wherein the payload is signed with the private key.

4. The method of claim 1, wherein the key pair and the token are generated by a first client from which the first creation request is received and the token is provided by the first client to a second client from which the first operation request originates.

5. The method of claim 1, wherein one or more of the nodes host a resource provider service, a gateway service, and the authorizer service, the access control apparatus comprises the one or more of the nodes, and the method further comprises, by the gateway service:

generating the key pair after receiving a second creation request from a first client, wherein the second creation request comprises the resource identifier; and storing an association of the resource identifier with the private key before sending the first creation request to the resource provider service.

6. The method of claim 5, further comprising, by the gateway service:

generating the token after receiving a second operation request from a second client different from the first client, wherein the second operation request comprises the resource identifier; and signing the token with the private key retrieved from the stored association before sending the signed token to the resource provider service.

7. The method of claim 1, wherein the one or more of the nodes host a database, the resource comprises a table of the database, and the resource identifier identifies the table.

8. An access control apparatus, comprising memory having instructions stored thereon and one or more processors coupled to the memory and configured to execute the stored instructions to:
after creating a resource in response to a first creation request, provide a resource identifier for the resource and a public key of a key pair to an authorizer service for insertion into a stored mapping, wherein the first creation request comprises the resource identifier and the public key;
send an authorization request to the authorizer service in response to a first operation request to perform an operation on the resource, wherein the first operation request comprises the resource identifier and a token signed with a private key of the key pair, the authorization request comprises the resource identifier, the operation, and the token, and the token identifies a capability;
receive an authorization of the first operation request from the authorization service in response to the authorization request when a signature of the token is validated by the authorizer service using the public key retrieved from the stored mapping using the resource identifier and the operation is validated by the authorizer service based on a match of the operation and the capability; and
execute the operation on the resource by communicating with at least one of a plurality of nodes of a decentralized network in response to the authorization of the first operation request.

9. The access control apparatus of claim 8, wherein the first creation request originates with a first client, the first operation request originates with a second client different from the first client, and the authorization request further comprises one or more of a time at which the first operation request was received or a user identifier of a user of the second client.

10. The access control apparatus of claim 9, wherein the one or more processors are further configured to execute the stored instructions to receive the authorization when one or more of the time at which the first operation request was received is within a validity period or the user identifier is validated by the authorizer service based on one or more checks in a payload of the token, wherein the payload is signed with the private key.

11. The access control apparatus of claim 8, wherein the key pair and the token are generated by a first client from which the first creation request is received and the token is provided by the first client to a second client from which the first operation request originates.

12. The access control apparatus of claim 8, wherein one or more of the nodes host a resource provider service, a gateway service, and the authorizer service, the access control apparatus comprises the one or more of the nodes, and the one or more processors are further configured to execute the stored instructions to execute the gateway service to:
generate the key pair after receiving a second creation request from a first client, wherein the second creation request comprises the resource identifier; and
store an association of the resource identifier with the private key before sending the first creation request to the resource provider service.

13. The access control apparatus of claim 12, wherein the one or more processors are further configured to execute the stored instructions to execute the gateway service to:
generate the token after receiving a second operation request from a second client different from the first client, wherein the second operation request comprises the resource identifier; and
sign the token with the private key retrieved from the stored association before sending the signed token to the resource provider service.

14. The access control apparatus of claim 8, wherein the one or more of the nodes host a database, the resource comprises a table of the database, and the resource identifier identifies the table.

15. A non-transitory computer-readable medium having stored thereon instructions for controlling access to decentralized network resources comprising executable code that, when executed by one or more processors, causes the one or more processors to:
after creating a resource in response to a first creation request, provide a resource identifier for the resource and a public key of a key pair to an authorizer service for insertion into a stored mapping, wherein the first creation request comprises the resource identifier and the public key;
send an authorization request to the authorizer service in response to a first operation request to perform an operation on the resource, wherein the first operation request comprises the resource identifier and a token signed with a private key of the key pair, the authorization request comprises the resource identifier, the operation, and the token, and the token identifies a capability;
receive an authorization of the first operation request from the authorization service in response to the authorization request when a signature of the token is validated by the authorizer service using the public key retrieved from the stored mapping using the resource identifier and the operation is validated by the authorizer service based on a match of the operation and the capability; and
execute the operation on the resource by communicating with at least one of a plurality of nodes of a decentralized network in response to the authorization of the first operation request.

16. The non-transitory computer-readable medium of claim 15, wherein the first creation request originates with a first client, the first operation request originates with a second client different from the first client, and the authorization request further comprises one or more of a time at which the first operation request was received or a user identifier of a user of the second client.

17. The non-transitory computer-readable medium of claim 16, wherein the executable code, when executed by the one or more processors, further causes the one or more processors to receive the authorization when one or more of the time at which the first operation request was received is within a validity period or the user identifier is validated by the authorizer service based on one or more checks in a payload of the token, wherein the payload is signed with the private key.

18. The non-transitory computer-readable medium of claim 15, wherein the key pair and the token are generated by a first client from which the first creation request is received and the token is provided by the first client to a second client from which the first operation request originates.

19. The non-transitory computer-readable medium of claim 15, wherein one or more of the nodes host a resource provider service, a gateway service, and the authorizer service and the executable code, when executed by the one or more processors, further causes the one or more processors to execute the gateway service to:
generate the key pair after receiving a second creation request from a first client, wherein the second creation request comprises the resource identifier; and
store an association of the resource identifier with the private key before sending the first creation request to the resource provider service.

20. The non-transitory computer-readable medium of claim 19, wherein the executable code, when executed by the one or more processors, further causes the one or more processors to execute the gateway service to:
generate the token after receiving a second operation request from a second client different from the first client, wherein the second operation request comprises the resource identifier; and
sign the token with the private key retrieved from the stored association before sending the signed token to the resource provider service.

21. The non-transitory computer-readable medium of claim 15, wherein the one or more of the nodes host a database, the resource comprises a table of the database, and the resource identifier identifies the table.

* * * * *